Oct. 30, 1923.
F. M. DAVIS
1,472,051
HOUSEHOLD APPLIANCE
Filed April 15, 1922
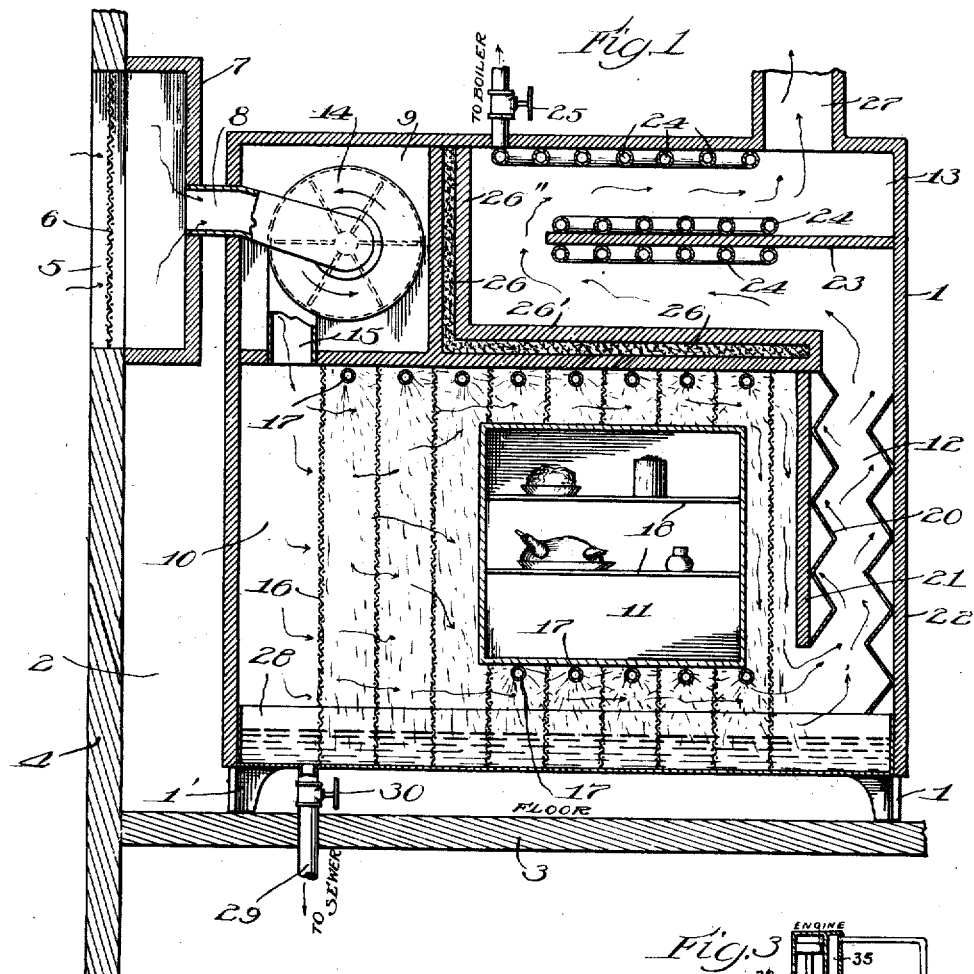
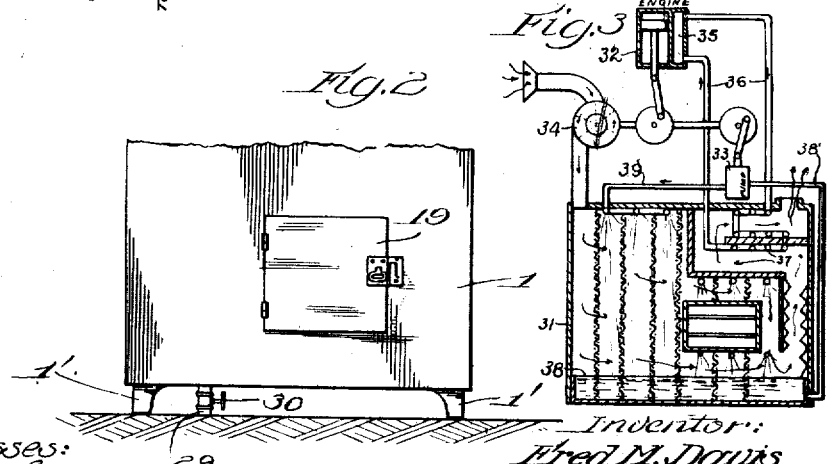
Witnesses:
Inventor:
Fred M. Davis
By Rummler & Rummler attys Patented Oct. 30, 1923.

1,472,051

UNITED STATES PATENT OFFICE.

FRED M. DAVIS, OF CHICAGO, ILLINOIS.

HOUSEHOLD APPLIANCE.

Application filed April 15, 1922. Serial No. 553,264.

*To all whom it may concern:*

Be it known that I, FRED M. DAVIS, a citizen of the United States of America, and a resident of Chicago, county of Cook, and State of Illinois, have invented a new and useful Improvement in Household Appliances, of which the following is a specification.

This invention relates to household appurtenances, and especially to apparatus having to do with air conditioning and refrigeration purposes. The main objects of the invention are to provide an improved form of air attempering or conditioning unit; to provide in combination therewith a cooler box or refrigeration chamber similar in function to an ordinary ice-box; and to provide a complete outfit of the character described including the necessary power plant for operating the equipment, as may be desirable and most efficient for the larger units, as, for instance, in connection with hotels and summer resorts.

An illustrative embodiment of this invention is shown diagrammatically in Figure 1.

Figure 2 is a fragmentary front elevation of the device shown in Figure 1, but on a reduced scale, and shows the closure member or door for the refrigerating chamber.

Figure 3 is a conventional diagram of such a unit in combination with a complete power plant, including engine, motor, blower, pump, etc.

In the construction shown in the drawings, the furniture unit 1 is in the form of a portable combination attempering air washer and cooler for foodstuffs, said unit being provided with feet or leg members 1′. This unit is mounted in the room 2 of the house, and the feet 1′ rest directly on the floor 3. The device is preferably mounted near an outer wall 4, near a window 5, which should be provided with a screen 6 and an enclosure 7. An air conduit 8 leads from the enclosure 7 to the body of the unit 1 for supplying air thereto.

The said unit 1 comprises mainly five parts or chambers, which may be characterized as the fan chamber 9, the air washing chamber 10, the cooler box 11, the humidifier flue 12, and the heater chamber 13.

In the chamber 9 is mounted a fan or blower 14, with which the intake air conduit 8 communicates, and said fan is provided with a discharge flue 15 leading to the washing chamber 10.

In the washing chamber a series of vertically disposed screens 16 and horizontally disposed sprinkler pipes 17 are mounted, said pipes being for the most part located in the upper part of the chamber, and being adapted and arranged to discharge small streams of water or spray downwardly through the horizontally moving current of air which is thereby washed, cooled and humidified. The screens serve to collect particles of dust which are washed off by downwardly flowing water. Moreover, these screens serve to somewhat retard and equalize the flow and distribution of air throughout the washing chamber.

Mounted in the washing chamber is a cooler box or refrigerating chamber 18, which is provided with a door 19, which may be similar in character to ordinary refrigeration doors.

In order to remove surplus moisture or water particles from the air as it leaves the chamber 10, dehumidifying baffles 20 are provided in the upwardly extending passageway 12, said baffles being mounted on the flue walls 21 and 22 respectively.

The air heating chamber 13 is provided with a baffle plate 23 so positioned as to increase the travel of the air through said chamber 13 and thereby thoroughly expose it to the heating coils 24 which are connected to a suitable source of heating material, as, for instance, steam or hot water, a supply valve 25 being provided to control the supply of heat to said chamber 13. In order to conserve the heat in said chamber and also prevent transmission of heat from chamber 13 to chamber 10, a layer of insulation 26 is disposed in the horizontal wall 26′. This insulation is also extended upward in the wall 26″.

The water discharge from the pipes 17 is collected in the base reservoir 28, which is provided with a waste pipe 29, communicating with the sewer, said pipe having a hand valve 30.

Referring now especially to Fig. 3, the comprehensive diagram here shown illustrates a preferred form of embodiment for use under certain circumstances where outside power is not available, as for instance, at a remote country hotel, summer resort or on a farm. Here the combination unit 31, which may be substantially like unit 1 of Fig. 1, is operated in connection with a small power plant of its own including an internal combustion engine 32, a pump 33 connected thereto and also a fan 34 also connected to said engine.

The water-jacket 35 of the engine is connected by pipes 36 to the air heating coils 37 of unit 31. The pump 33 circulates the water from the reservoir or collecting basin 38 through the pipes 38' and 39 and so supplies the spray nozzles. Further than this the main features of structure and operation are substantially like or equivalent to those of Fig. 1.

Although but one complete specific embodiment of this invention has been herein shown and described as in the diagram of Fig. 3, and a somewhat modified form illustrating more in detail some of the structural features of the combination furniture unit, as in Fig. 1, nevertheless it will be understood that numerous details of the constructions shown may be altered or omitted without departing from the spirit of this invention as defined by the following claims.

I claim:

1. A unit of the character described comprising a spray chamber, a cooler box in said chamber, means to induce a draft through said chamber, said chamber having a series of screens through which the draft passes, and spray pipes disposed to discharge water upon said screens whereby particles deposited thereon by the air are washed off.

2. A unit of the character described comprising a blower chamber and blower therein, a spray chamber and spray heads therein, a closed cooler box in said chamber, a trap to remove entrained water particles, and an air warming chamber with heating means therein, all arranged successively along the path of the air in the order enumerated.

3. A combination refrigerating and air conditioning unit comprising an air washing chamber, an air warming chamber communicating therewith, a baffle passageway connecting said chambers, a refrigerator box within said washing chamber, means to produce spray in said washing chamber, and evaporation inducing means of screen-like character adjacent to said box.

4. A combination self driven refrigerating and air conditioning unit comprising mainly a two chambered housing and an internal combustion engine, one of the chambers having therein a refrigerator box, evaporation screens, and spray nozzles, and the other chamber having air warming means communicating with the water jacket of said engine, a pump connected to said nozzles, and a fan, said fan and pump being operatively connected to said engine.

Signed at Chicago this 13th day of April 1922.

FRED M. DAVIS.